United States Patent
Akaba et al.

(10) Patent No.: US 11,961,374 B2
(45) Date of Patent: Apr. 16, 2024

(54) POS TERMINAL DEVICE WITH ROTATABLE OPERATOR AND CUSTOMER DISPLAYS

(71) Applicant: NEC Platforms, Ltd., Kawasaki (JP)

(72) Inventors: Kunihiro Akaba, Kanagawa (JP); Katsumi Harashima, Kanagawa (JP); Akihisa Iwata, Kanagawa (JP)

(73) Assignee: NEC Platforms, Ltd., Kanagawa (JP)

( * ) Notice: Subject to any disclaimer, the term of this patent is extended or adjusted under 35 U.S.C. 154(b) by 0 days.

(21) Appl. No.: 17/626,192

(22) PCT Filed: Jun. 4, 2020

(86) PCT No.: PCT/JP2020/022054
§ 371 (c)(1),
(2) Date: Jan. 11, 2022

(87) PCT Pub. No.: WO2021/010045
PCT Pub. Date: Jan. 21, 2021

(65) Prior Publication Data
US 2022/0292932 A1 Sep. 15, 2022

(30) Foreign Application Priority Data
Jul. 17, 2019 (JP) .................................. 2019-131548

(51) Int. Cl.
*G07G 1/00* (2006.01)
*G06Q 20/20* (2012.01)
*G07G 1/12* (2006.01)

(52) U.S. Cl.
CPC .............. *G07G 1/0018* (2013.01); *G07G 1/12* (2013.01); *G06Q 20/20* (2013.01)

(58) Field of Classification Search
CPC ..................................................... G07G 1/0018
(Continued)

(56) References Cited

U.S. PATENT DOCUMENTS

2017/0060516 A1   3/2017   Nakashima
2017/0206750 A1*  7/2017   Baitz .................. F16M 11/2028
(Continued)

FOREIGN PATENT DOCUMENTS

JP    2010-009284 A      1/2010
JP    2013182485 A  *    9/2013
(Continued)

OTHER PUBLICATIONS

Machine translation of JP 2013182485, retrieved Dec. 3, 2022 (Year: 2022).*

(Continued)

*Primary Examiner* — Suezu Ellis
(74) *Attorney, Agent, or Firm* — Sughrue Mion, PLLC

(57) ABSTRACT

In a POS terminal device (1) according to the present invention, a rotation center of an operator-side rotation shaft (31) is at a position spaced apart from a longitudinal center line of a housing (2), a rotation center of a customer-side rotation shaft (41) is at a position spaced apart from the center line on an opposite side of the operator-side rotation shaft (31), an operator display (3) is rotated by 90 degrees in a horizontal direction around the operator-side rotation shaft (31) in such a way that a lateral end surface having a shorter distance from the rotation center of the operator-side rotation shaft (31) approaches a customer display (4), and the customer display (4) is rotated by 90 degrees in the horizontal direction around the customer-side rotation shaft (41) in the same direction as the operator display (3).

6 Claims, 11 Drawing Sheets

(58) Field of Classification Search
USPC .......................................................... 235/383
See application file for complete search history.

(56) References Cited

U.S. PATENT DOCUMENTS

| | | | |
|---|---|---|---|
| 2019/0236913 A1* | 8/2019 | Susaki | G06Q 20/204 |
| 2019/0263161 A1 | 8/2019 | Gotanda et al. | |
| 2019/0279470 A1* | 9/2019 | Nishio | G07G 1/00 |

FOREIGN PATENT DOCUMENTS

| | | |
|---|---|---|
| JP | 2016-091106 A | 5/2016 |
| JP | 2019-117447 A | 7/2019 |
| JP | 2019-144993 A | 8/2019 |

OTHER PUBLICATIONS

International Search Report for PCT Application No. PCT/JP2020/022054, dated Jun. 30, 2020.
JP Office Action for JP Application No. 2019-131548, dated Jun. 16, 2020 with English Translation.

\* cited by examiner

POS TERMINAL DEVICE WITH ROTATABLE OPERATOR AND CUSTOMER DISPLAYS

This application is a National Stage Entry of PCT/JP2020/022054 filed on Jun. 4, 2020, which claims priority from Japanese Patent Application 2019-131548 filed on Jul. 17, 2019, the contents of all of which are incorporated herein by reference, in their entirety.

TECHNICAL FIELD

The present invention relates to a POS terminal device.

BACKGROUND ART

A point of sales (POS) terminal device has been introduced in many stores such as retail stores in order to settle a price to be paid by a customer. A POS terminal device is known which includes an operator display for an employee to confirm input information and the like, and a customer display for a customer to confirm a payment amount and the like. For example, Patent Literature 1 discloses a POS terminal device including a main body of the POS terminal device, a store clerk display device having a screen for displaying information to a store clerk, and a customer display device having a display unit provided with a screen for displaying information to a customer.

CITATION LIST

Patent Literature

[Patent Literature 1] Japanese Unexamined Patent Application Publication No. 2016-091106

SUMMARY OF INVENTION

Technical Problem

The operator display and the customer display are preferably large from a viewpoint of visibility of the screen. It is preferable that a housing (main body) of the POS terminal device is small from a viewpoint of installation space. In addition, there is a user's desire to rotate either one of the operator display and the customer display by 90 degrees in a horizontal direction. However, when either one of the operator display and the customer display having a size larger than a size of the housing is intended to be rotated by 90 degrees in the horizontal direction, one of the displays may interfere and collide with another display.

The present invention has been made in view of such a problem, and an object of the present invention is to provide a POS terminal device capable of rotating either one of an operator display and a customer display by 90 degrees in a horizontal direction without interfering with another display even when sizes of the operator display and the customer display are larger than a size of a housing.

Solution to Problem

A POS terminal device according to an aspect of the present invention includes:
a housing;
an operator display mounted at one longitudinal end of an upper surface of the housing; and
a customer display mounted at another longitudinal end of the upper surface of the housing, wherein
the operator display and the customer display are arranged in such a way that rear surfaces face each other and each lateral center point passes through a longitudinal center line of the housing,
the operator display has an operator-side rotation shaft that supports the operator display and allows the operator display to be rotated by a predetermined angle or less in a horizontal direction,
the customer display has a customer-side rotation shaft that supports the customer display and allows the customer display to be rotated by a predetermined angle or less in a horizontal direction,
a rotation center of the operator-side rotation shaft is at a position that is spaced apart from the center line,
a rotation center of the customer-side rotation shaft is at a position that is spaced apart from the center line on an opposite side of the operator-side rotation shaft,
the operator display is rotated by 90 degrees around the operator-side rotation shaft in such a way that a lateral end surface having a shorter distance from the rotation center of the operator-side rotation shaft approaches the customer display, and
the customer display is rotated by 90 degrees around the customer-side rotation shaft in the same direction as the operator display.

A POS terminal device according to another aspect of the present invention includes:
a housing;
an operator display mounted at one longitudinal end of an upper surface of the housing; and
a customer display mounted at another longitudinal end of the upper surface of the housing, wherein
the operator display and the customer display are arranged in such a way that rear surfaces face each other and each lateral center point passes through a longitudinal center line of the housing,
the operator display has an operator-side rotation shaft that supports the operator display and allows the operator display to be rotated by a predetermined angle or less in a horizontal direction,
the customer display has a customer-side rotation shaft that supports the customer display and allows the customer display to be rotated by a predetermined angle or less in a horizontal direction,
a rotation center of the operator-side rotation shaft is at a position that is spaced apart from the center line,
a rotation center of the customer-side rotation shaft is at a position on the center line,
the operator display is rotated by 90 degrees around the operator-side rotation shaft in such a way that a lateral end surface having a shorter distance from the rotation center of the operator-side rotation shaft approaches the customer display, and
the customer display is rotated around the customer-side rotation shaft in the same direction as the operator display.

A POS terminal device according to another aspect of the present invention includes:
a housing;
an operator display mounted at one longitudinal end of an upper surface of the housing; and
a customer display mounted at another longitudinal end of the upper surface of the housing, wherein the operator display and the customer display are arranged in such a way that rear surfaces face each other and each lateral center point passes through a longitudinal center line of the housing, the operator display has an operator-side rotation shaft that supports the operator display and allows the operator display to be rotated by a predetermined angle or less in a horizontal direction, the customer display has a customer-side rotation shaft that supports the customer display and allows the customer display to be rotated by a predetermined angle or less in a horizontal direction, a rotation center of the customer-side rotation shaft is at a position that is spaced apart from the center line, a rotation center of the operator-side rotation shaft is at a position on the center line, the customer display is rotated by 90 degrees around the customer-side rotation shaft in such a way that a lateral end surface having a shorter distance from the rotation center of the customer-side rotation shaft approaches the operator display, and the operator display is rotated around the customer-side rotation shaft in the same direction as the customer display.

Advantageous Effects of Invention

According to the present invention, even when sizes of the operator display and the customer display are larger than a size of the housing, it is possible to provide a POS terminal device in which either one of the operator display and the customer display can be rotated by 90 degrees in a horizontal direction without interfering with another display.

DESCRIPTION OF EXAMPLE EMBODIMENTS

Hereinafter, specific example embodiments to which the present invention is applied will be described in detail with reference to the drawings. However, the present invention is not limited to the following example embodiments. In order to clarify the description, the following description and the drawings are appropriately simplified.

First Example Embodiment

Figure 1:
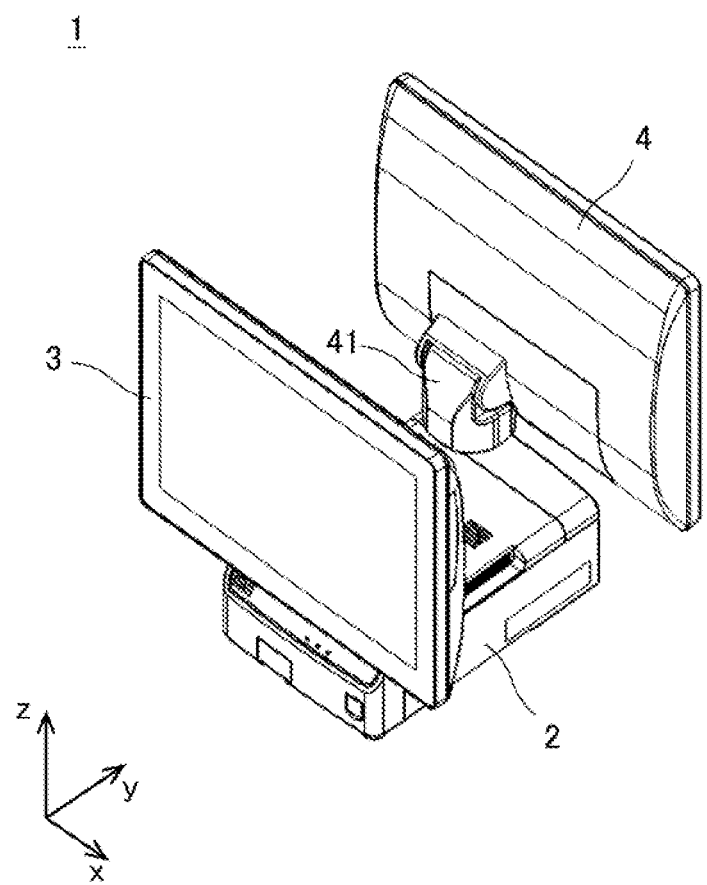
FIG. 1 is a perspective view of a first mode of a POS terminal device according to a first example embodiment.
Figure 2:
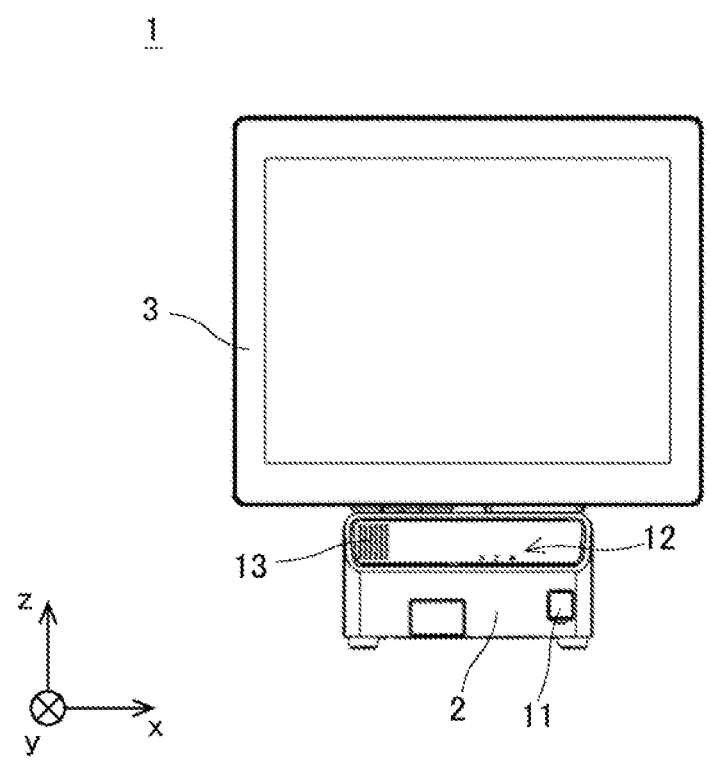
FIG. 2 is a front view of the first mode of the POS terminal device according to the first example embodiment.
Figure 3:
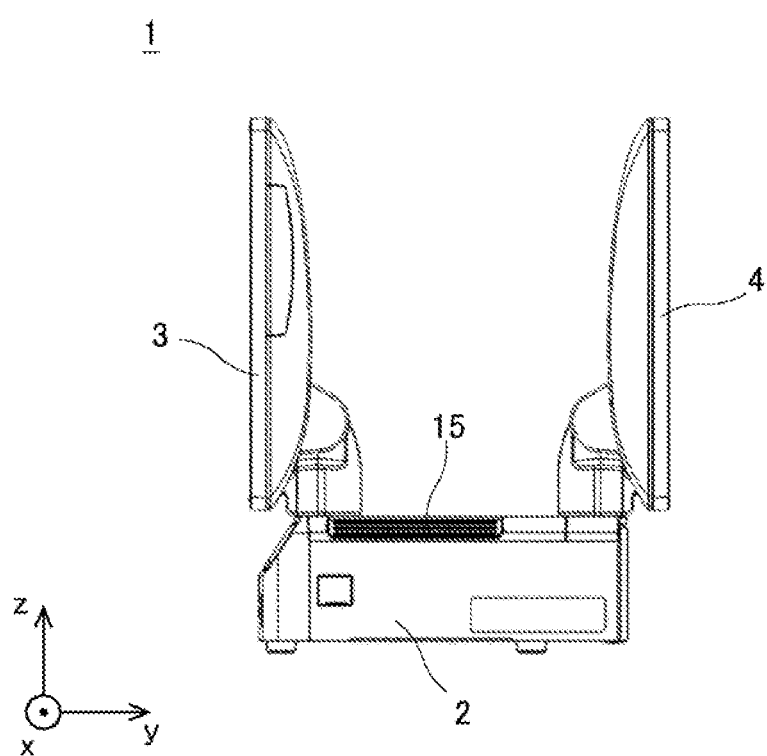
FIG. 3 is a side view of the first mode of the POS terminal device according to the first example embodiment.
Figure 4:
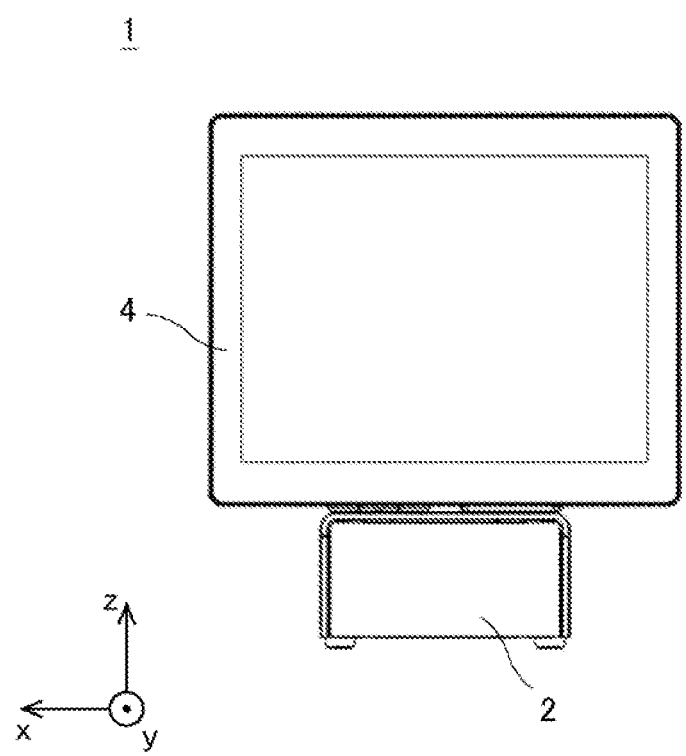
FIG. 4 is a rear view of the first mode of the POS terminal device according to the first example embodiment.
Figure 5:
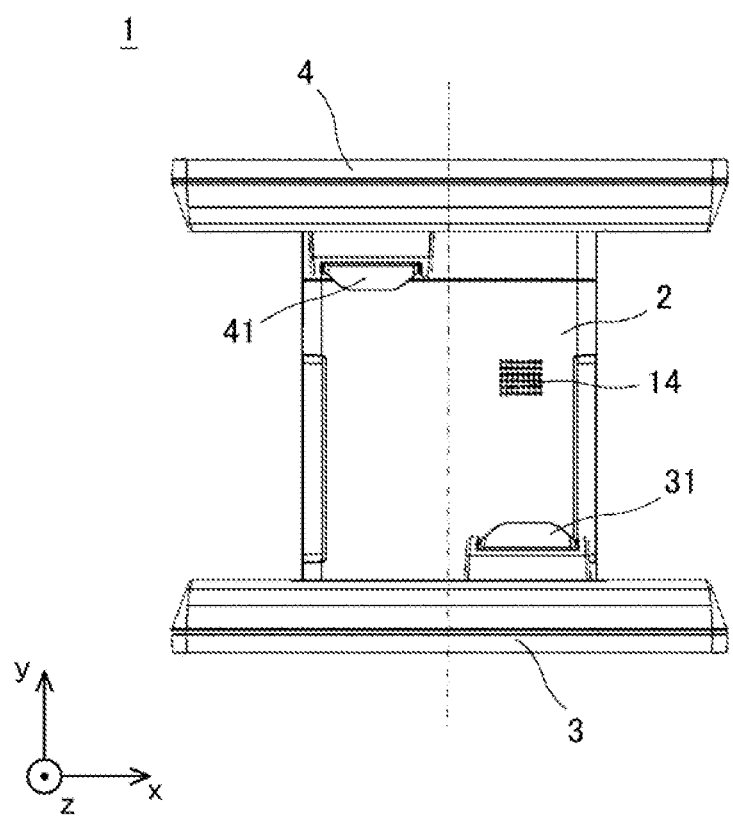
FIG. 5 is a top view of the first mode of the POS terminal device according to the first example embodiment.

A POS terminal device according to a first example embodiment can be used in four modes being a first mode to a fourth mode. First, a first mode of the POS terminal device according to the first example embodiment will be described with reference to FIGS. 1 to 5. FIG. 1 is a perspective view of the first mode of the POS terminal device according to the first example embodiment. FIG. 2 is a front view of the first mode of the POS terminal device according to the first example embodiment. FIG. 3 is a side view of the first mode of the POS terminal device according to the first example embodiment. FIG. 4 is a rear view of the first mode of the POS terminal device according to the first example embodiment. FIG. 5 is a top view of the first mode of the POS terminal device according to the first example embodiment.

(First Mode)

A first mode of a POS terminal device 1 is a mode in which neither an operator display 3 nor a customer display 4 is rotated in a horizontal direction. As illustrated in FIG. 1, the POS terminal device 1 includes a housing 2, an operator display 3, and a customer display 4. As illustrated in FIG. 5, the operator display 3 includes an operator-side rotation shaft 31. The customer display 4 includes a customer-side rotation shaft 41. It is noted as a matter of course that right-handed xyz orthogonal coordinates illustrated in FIG. 1 and other drawings are for convenience of explanation of a positional relationship of constituent elements. A z-axis positive direction is vertically upward and a xy plane is a horizontal plane, which are common among the drawings.

The housing 2 is an elongated member in a top view. Specifically, as illustrated in FIG. 1, for example, the housing 2 is a substantially rectangular body having a substantially rectangular upper surface. Further, the housing 2 may be a structure or the like having an elliptical upper surface. A control board or the like functioning as a control unit is stored in the housing 2. The control unit stored in the housing 2 controls the entire device including the operator display 3 and the customer display 4.

The operator display 3 and the customer display 4 are attached to an upper surface of the POS terminal device 1. The operator display 3 is attached to one end (near an edge) of the upper surface of the housing 2 in a longitudinal direction. The customer display 4 is attached to another end (near an edge) of the upper surface of the housing 2 in the longitudinal direction. Of six surfaces of the housing 2 illustrated in FIG. 1, a surface parallel to a latitudinal direction and on a side to which the operator display 3 is attached is defined as a front surface of the housing 2. A surface parallel to the front surface of the housing 2 and on a side to which the customer display 4 is attached is defined as a rear surface of the housing 2. Two surfaces parallel to the longitudinal direction of the housing 2 and parallel to a vertical direction are defined as side surfaces of the housing 2.

The POS terminal device 1 is used by connecting accessory devices such as a bar code reader and a printer. The accessory device is connected to the housing 2 by using a connection cable. A connection hole that is not illustrated is provided in a bottom surface of the housing 2. The accessory device is connected to a circuit of the control board stored in the housing 2 by a connection cable through the connection hole provided in the housing 2. As illustrated in FIG. 2, a power source switch 11, a plurality of LEDs 12 including LEDs indicating ON/OFF states of power, and a speaker hole 13 for an operator are provided on the front surface of the housing 2. As illustrated in FIG. 5, a speaker hole 14 for a customer is provided on the upper surface of the housing 2. As illustrated in FIG. 3, a vent hole 15 is provided in each of the two side surfaces of the housing 2. The arrangement of the components provided in the housing 2 described above can be changed as appropriate. If unnecessary, it may not be provided.

As illustrated in FIG. 2 and the like, the operator display 3 has a screen for displaying information for an operator (employee) to confirm input information and the like. A touch panel is superimposed on the screen of the operator display 3, and the operator can input payment information and the like to the POS terminal device 1 by operating the touch panel. The operator display 3 has the operator-side rotation shaft 31. The operator-side rotation shaft 31 is a rotation shaft extending in the vertical direction. The operator-side rotation shaft 31 supports the operator display 3 and is capable of rotating the operator display 3 in the horizontal direction up to a predetermined angle.

As illustrated in FIG. 4 and the like, the customer display 4 has a screen for displaying information for a customer to confirm payment amount and the like. The screen of the customer display 4 may or may not be superimposed with a touch panel. The customer display 4 has the customer-side rotation shaft 41. The customer-side rotation shaft 41 is a rotation shaft extending in the vertical direction. The customer-side rotation shaft 41 supports the customer display 4 and is capable of rotating the customer display 4 in the horizontal direction up to a predetermined angle.

A surface on which the screen of the operator display 3 is formed is defined as a front surface of the operator display 3. A surface on which no screen is formed is defined as a rear surface of the operator display 3. A surface on which the screen of the customer display 4 is formed is defined as a front surface of the customer display 4. A surface on which no screen is formed is defined as a rear surface of the customer display 4. As illustrated in FIG. 1 and the like, the operator display 3 and the customer display 4 are arranged in such a way that their rear surfaces face each other. A two-dot chain line illustrated in FIG. 5 is a longitudinal center line of the housing 2. As illustrated in FIG. 5, the operator display 3 and the customer display 4 are arranged in such a way that each lateral center point passes through the center line and the front surface is parallel to the latitudinal direction of the housing 2.

The sizes of the operator display 3 and the customer display 4 are not particularly limited, but are preferably large from the viewpoint of visibility. In the present example embodiment, as illustrated in FIG. 5 and the like, lateral lengths of the operator display 3 and the customer display 4 are longer than a length in the latitudinal direction of the housing 2 and longer than the length in the longitudinal direction of the housing 2. The sizes of the operator display 3 and the customer display 4 may be the same or substantially the same as illustrated in FIG. 5, or may be different. When the operator display 3 and the customer display 4 have the same size, the same components can be used as the operator display 3 and the customer display 4.

Among four surfaces continuous to the front surface of the operator display 3, a surface parallel to the upper surface of the housing 2 and having a distance farther from the housing 2 is defined as an upper end surface. Of the four surfaces in contact with the front surface of the operator display 3, two surfaces parallel to the side surfaces of the housing 2 are defined as lateral end surfaces. The operator display 3 is attached to the operator-side rotation shaft 31 via a hinge. Therefore, the operator display 3 is rotatable around the hinge in such a way that the upper end surface thereof approaches the customer display 4, i.e., in the vertical direction. A rotation angle is not particularly limited, but is, for example, 0 degrees or more and 45 degrees or less. By rotating the operator display 3 around the hinge, the orientation of the screen of the operator display 3 can be adjusted in accordance with the line of sight of the operator.

The operator-side rotation shaft 31 is arranged at a position where a rotation center is spaced apart from a longitudinal center line of the housing 2. In the example illustrated in FIG. 5, the operator-side rotation shaft 31 is arranged on the x-axis positive direction side of the longitudinal center line of the housing 2. The operator-side rotation shaft 31 is rotatable by a predetermined angle or less in such a way as to rotate the operator display 3 in such a way that the lateral end surface having a shorter distance from the rotation center of the operator-side rotation shaft 31 approaches the customer display 4. The predetermined angle is 90 degrees counterclockwise and 30 degrees clockwise in FIG. 5. In a case where the operator-side rotation shaft 31 and the customer-side rotation shaft 41 are on the longitudinal center line of the housing 2, the operator display 3 interferes with the customer-side rotation shaft 41 when the operator display 3 is intended to be rotated by 90 degrees. In other words, when the operator-side rotation shaft 31 and the customer-side rotation shaft 41 are on the longitudinal center line of the housing 2, the operator display 3 and the customer display 4 are arranged at a distance that the operator display 3 cannot be rotated by 90 degrees.

Among four surfaces in contact with the front surface of the customer display 4, a surface parallel to the upper surface of the housing 2 and having a distance farther from the housing 2 is defined as an upper end surface. Of the four surfaces in contact with the front surface of the customer display 4, two surfaces parallel to the side surfaces of the housing 2 are defined as lateral end surfaces. The customer display 4 is attached to the customer-side rotation shaft 41 via a hinge. Therefore, the customer display 4 is rotatable around the hinge in such a way that the upper end surface thereof approaches the operator display 3, i.e., in the vertical direction. A rotation angle is not particularly limited, but is, for example, 0 degrees or more and 45 degrees or less. By rotating the customer display 4 around the hinge, the orientation of the screen of the customer display 4 can be adjusted in accordance with the line of sight of the customer.

The customer-side rotation shaft 41 is arranged at a position where a rotation center is spaced apart from the longitudinal center line of the housing 2 on an opposite side of the operator-side rotation shaft 31. In the example illustrated in FIG. 5, the rotation center of the customer-side rotation shaft 41 and the rotation center of the operator-side rotation shaft 31 are point symmetric or substantially point symmetric around a point on the longitudinal center line of the housing 2. In the example illustrated in FIG. 5, the customer-side rotation shaft 41 is arranged on an x-axis negative direction side of the longitudinal center line of the housing 2. The customer-side rotation shaft 41 is rotatable by a predetermined angle or less in such a way as to rotate the customer display 4 in such a way that the lateral end surface having a shorter distance from the rotation center of the customer-side rotation shaft 41 approaches the operator display 3. In other words, the customer-side rotation shaft 41 is rotatable in the same direction as the operator-side rotation shaft 31. The predetermined angle is 90 degrees counterclockwise and 30 degrees clockwise in FIG. 5. In a case where the operator-side rotation shaft 31 and the customer-side rotation shaft 41 are on the longitudinal center line of the housing 2, the customer display 4 interferes with the operator-side rotation shaft 31 when the customer display 4 is intended to be rotated by 90 degrees. In other words, when the operator-side rotation shaft 31 and the customer-side rotation shaft 41 are on the longitudinal center line of the housing 2, the operator display 3 and the customer display 4 are arranged at a distance that the customer display 4 cannot be rotated by 90 degrees.

(Second Mode)

Figure 6:
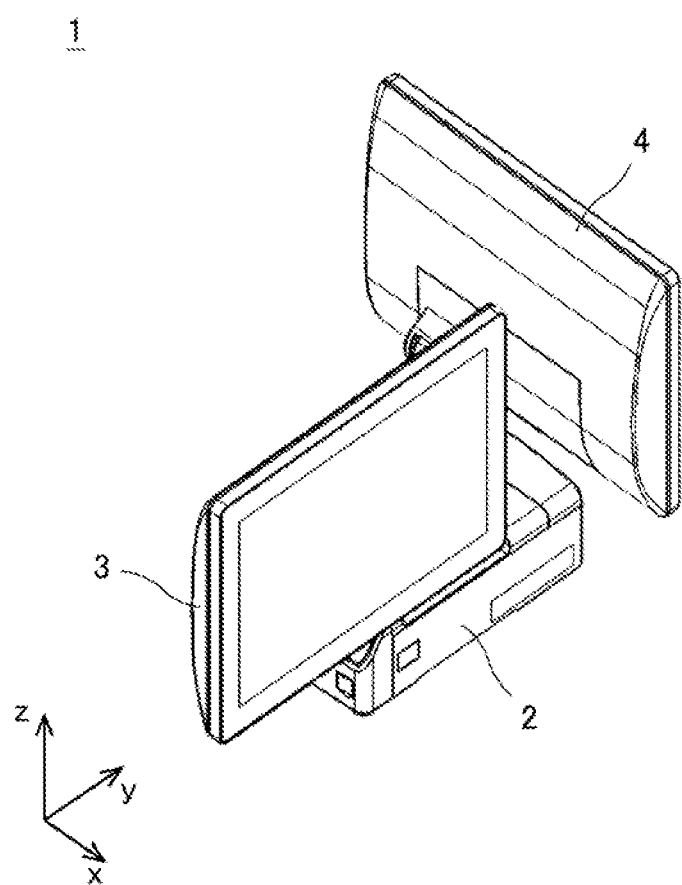
FIG. 6 is a perspective view of a second mode of the POS terminal device according to the first example embodiment.
Figure 7:
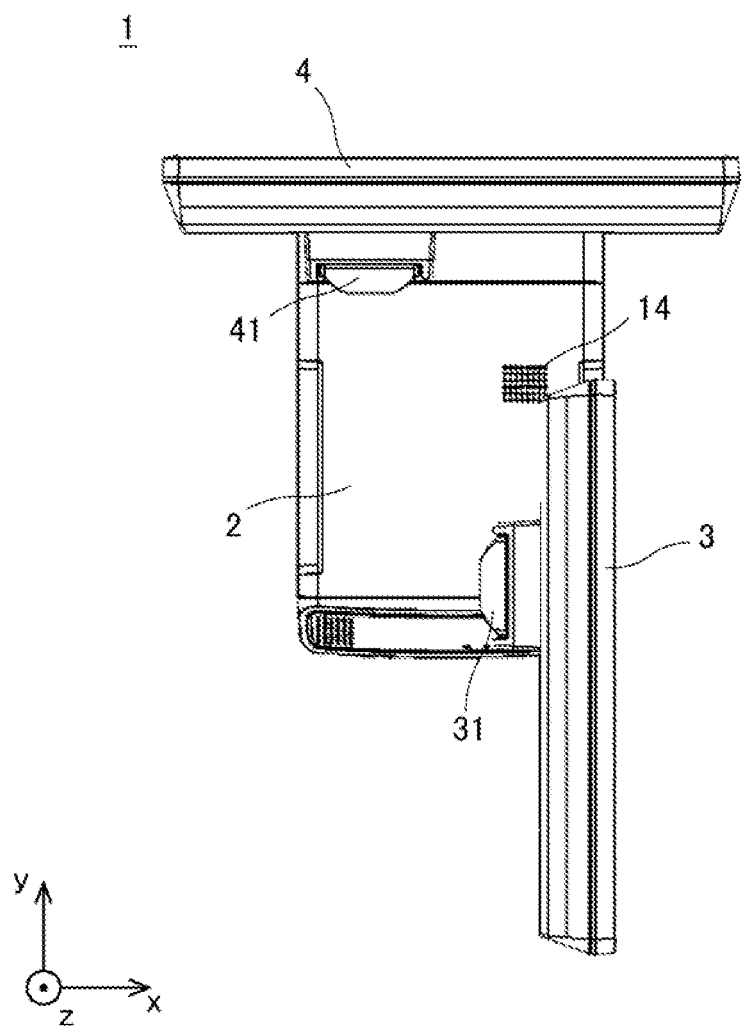
FIG. 7 is a top view of the second mode of the POS terminal device according to the first example embodiment.

Next, a second mode of the POS terminal device according to the first example embodiment will be described with reference to FIGS. 6 and 7. FIG. 6 is a perspective view of the second mode of the POS terminal device according to the first example embodiment. FIG. 7 is a top view of the second mode of the POS terminal device according to the first example embodiment. The second mode of the POS terminal device 1 is a mode in which the operator display 3 is rotated in the horizontal direction and the customer display 4 is not rotated in the horizontal direction. In the example illustrated in FIGS. 6 and 7, the operator display 3 is rotated by 90 degrees in the horizontal direction. Accordingly, the operator display 3 and the customer display 4 form an angle of 90 degrees.

As illustrated in FIG. 7, a distance from the lateral end surface of the operator display 3 closer to the rotation center of the operator-side rotation shaft 31 to the front surface of the housing 2 is shorter than a distance from the rear surface of the customer display 4 to the front surface of the housing 2. Therefore, when the operator display 3 is rotated by 90 degrees in the horizontal direction, the operator display 3 and the customer display 4 do not interfere with each other. This is because, as described in the first mode, the operator-side rotation shaft 31 is arranged apart from the longitudinal center line of the housing 2. The customer-side rotation shaft 41 is also arranged apart from the longitudinal center line of the housing 2, and the operator display 3 and the customer display 4 do not interfere with each other when the operator display 3 is rotated by 90 degrees in the horizontal direction. The POS terminal device 1 of the second mode is suitably installed at a corner, an end, or the like of a store counter.

(Third Mode)

Figure 8:
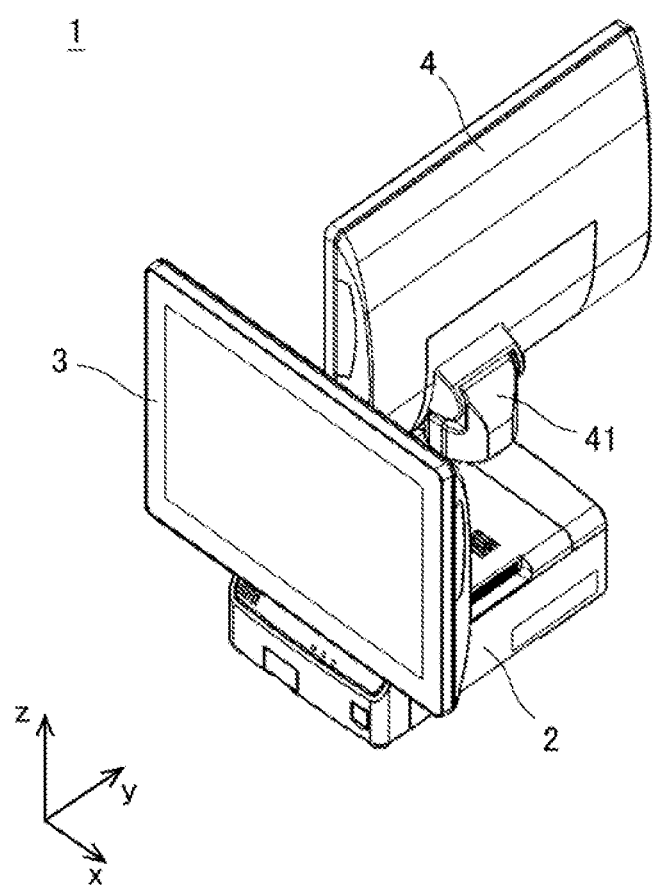
FIG. 8 is a perspective view of a third mode of the POS terminal device according to the first example embodiment.
Figure 9:
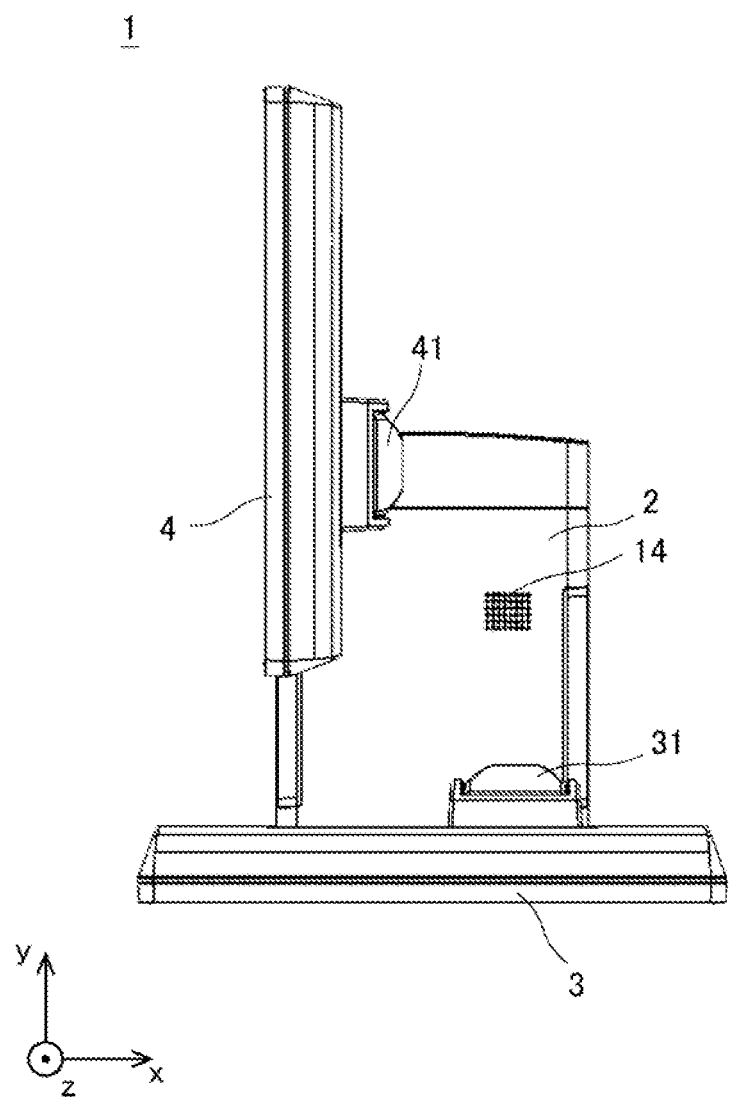
FIG. 9 is a top view of the third mode of the POS terminal device according to the first example embodiment.

Next, a third mode of the POS terminal device according to the first example embodiment will be described with reference to FIGS. 8 and 9. FIG. 8 is a perspective view of the third mode of the POS terminal device according to the first example embodiment. FIG. 9 is a top view of the third mode of the POS terminal device according to the first example embodiment. The third mode of the POS terminal device 1 is a mode in which the operator display 3 is not rotated in the horizontal direction, and the customer display 4 is rotated in the horizontal direction. In the example illustrated in FIGS. 8 and 9, the customer display 4 is rotated by 90 degrees in the horizontal direction. Accordingly, the operator display 3 and the customer display 4 form an angle of 90 degrees.

As illustrated in FIG. 9, a distance from a lateral end surface of the customer display 4 closer to the rotation center of the customer-side rotation shaft 41 to the rear surface of the housing 2 is shorter than a distance from the rear surface of the operator display 3 to the rear surface of the housing 2. Therefore, when the customer display 4 is rotated by 90 degrees in the horizontal direction, the operator display 3 and the customer display 4 do not interfere with each other. This is because, as described in the first mode, the customer-side rotation shaft 41 is arranged apart from the longitudinal center line of the housing 2. The operator-side rotation shaft 31 is also arranged apart from the longitudinal center line of the housing 2, and the operator display 3 and the customer display 4 do not interfere with each other when the customer display 4 is rotated by 90 degrees in the horizontal direction. The POS terminal device 1 of the third mode is suitably installed at a corner, an end, or the like of a store counter.

(Fourth Mode)

Figure 10:
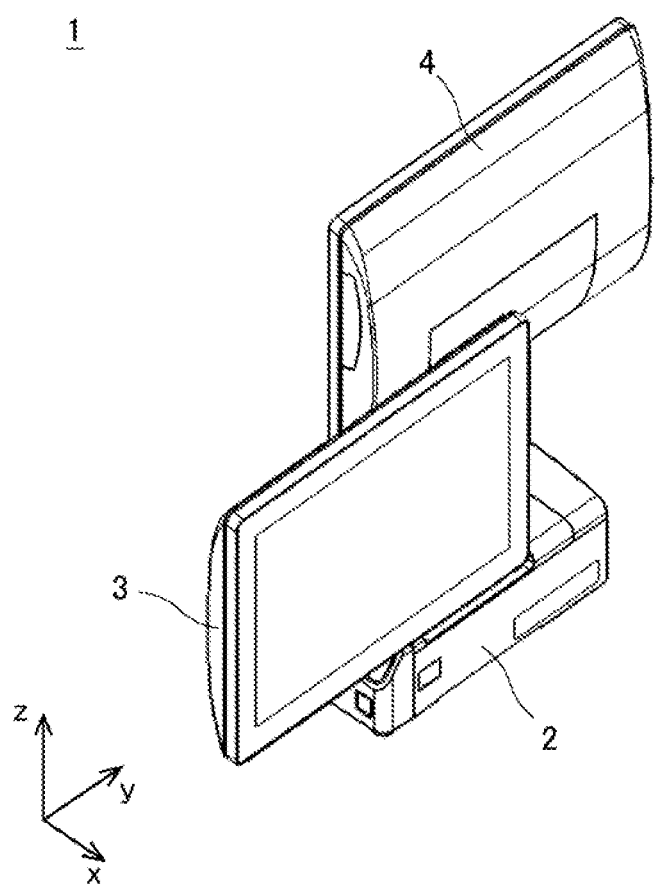
FIG. 10 is a perspective view of a fourth mode of the POS terminal device according to the first example embodiment.
Figure 11:
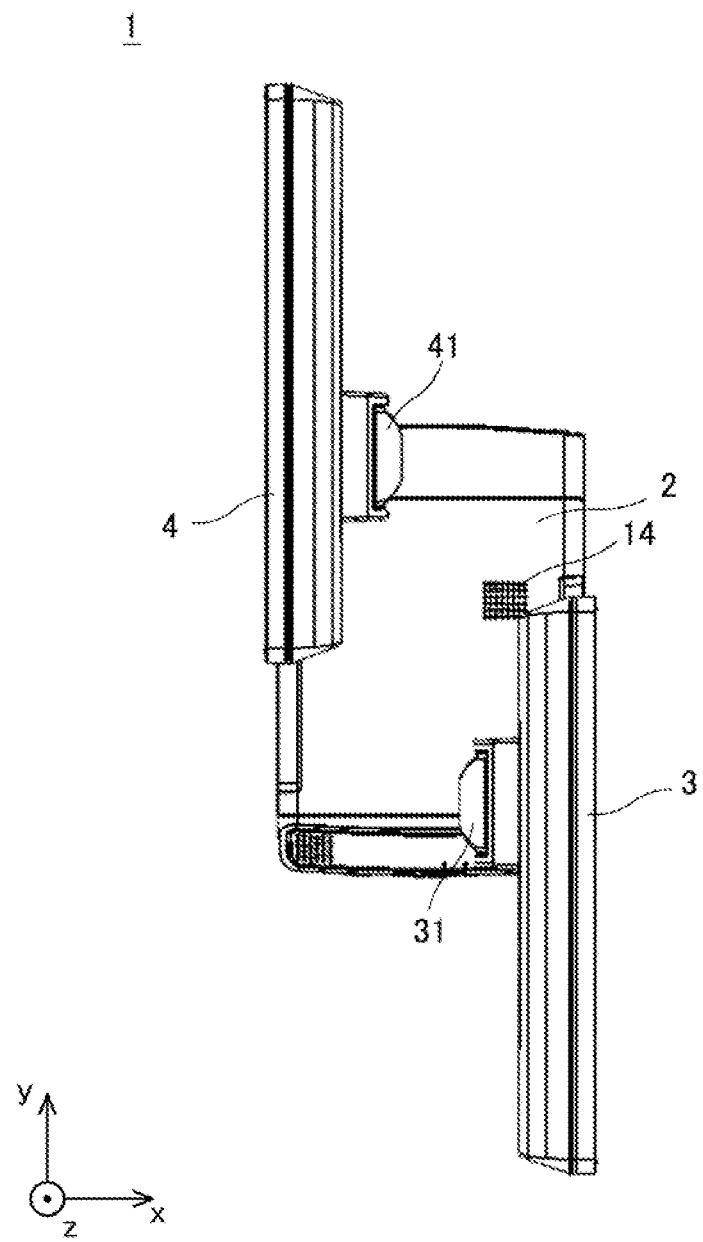
FIG. 11 is a top view of the fourth mode of the POS terminal device according to the first example embodiment.

Next, a fourth mode of the POS terminal device according to the first example embodiment will be described with reference to FIGS. 10 and 11. FIG. 10 is a perspective view of the fourth mode of the POS terminal device according to the first example embodiment. FIG. 11 is a top view of the fourth mode of the POS terminal device according to the first example embodiment. The fourth mode of the POS terminal device 1 is a mode in which both the operator display 3 and the customer display 4 are rotated in the horizontal direction.

In the example illustrated in FIGS. 10 and 11, both the operator display 3 and the customer display 4 are rotated by 90 degrees in the horizontal direction. Therefore, the operator display 3 and the customer display 4 are parallel to each other in such a way that their rear surfaces face each other. In the fourth mode of the POS terminal device 1, a distance between the operator display 3 and the customer display 4 is shorter than that in the first mode. Therefore, the POS terminal device 1 of the fourth mode is suitably installed in a store counter that is narrow in width.

In addition, from the viewpoint of installation space of the POS terminal device 1, in the fourth mode, it is preferable that a distance in the longitudinal direction between the lateral end surface farther from a rotation center of the operator display 3 and the lateral end surface farther from a rotation center of the customer display 4 is short. In other words, a distance in the longitudinal direction between the rotation shafts of the displays is preferably shorter than the sum of a distance between the lateral end surface close to the rotation center of the operator display 3 and the rotation center, and a distance between the lateral end surface close to the rotation center of the customer display 4 and the rotation center. As described above, even when the sizes of the operator display and the customer display are larger than the size of the housing, the POS terminal device 1 can rotate either one of the operator display and the customer display by 90 degrees in the horizontal direction without interfering with another display. Incidentally, when the sizes of the operator display and the customer display are larger than the size of the housing, it means that the size of the housing is a size for which a trouble that will be described below occurs. Namely, this means that the size of the housing is a size that when the operator-side rotation shaft and the customer-side rotation shaft are arranged on the longitudinal center line of the housing, a problem arises in that when the operator display is intended to be rotated by 90 degrees in the horizontal direction, interference with the customer display including the customer-side rotation shaft occurs, or when the customer display is intended to be rotated by 90 degrees in the horizontal direction, interference with the operator display including the operator-side rotation shaft occurs.

Variation of First Example Embodiment

In the example embodiment described above, the case where the operator-side rotation shaft 31 is arranged on the x-axis positive direction side of the longitudinal center line of the housing 2 and the customer-side rotation shaft 41 is arranged on the x-axis negative direction side of the center line has been described. However, in the POS terminal device 1, the operator-side rotation shaft 31 may be arranged on the x-axis negative direction side of the longitudinal center line of the housing 2, and the customer-side rotation shaft 41 may be arranged on the x-axis positive direction side of the center line. In this case, the operator-side rotation shaft 31 and the customer-side rotation shaft 41 each rotate clockwise by 90 degrees.

Second Example Embodiment

A POS terminal device according to a second example embodiment is different from the POS terminal device according to the first example embodiment in that a customer-side rotation shaft 41 is arranged in such a way that a rotation center of the customer-side rotation shaft 41 is on a longitudinal center line of a housing 2. Other configurations are the same as those of the first example embodiment, and therefore, duplicated descriptions are omitted as appropriate.

In the second example embodiment, the customer-side rotation shaft 41 rotates in the same direction as an operator-side rotation shaft 31 by a predetermined angle or less. The predetermined angle is not particularly limited, but is preferably 0 degrees or more and less than 90 degrees. In the POS terminal device according to the second example embodiment, when an operator display 3 is rotated by 90 degrees in a horizontal direction, the operator display 3 and a customer display 4 do not interfere with each other. The POS terminal device according to the second example embodiment is preferably used in the first mode and the second mode illustrated in the first example embodiment. The variation described in the first example embodiment is similarly performed in the POS terminal device according to the second example embodiment as well.

Third Example Embodiment

A POS terminal device according to a third example embodiment is different from the POS terminal device according to the first example embodiment in that an operator-side rotation shaft 31 is arranged in such a way that a rotation center of the operator-side rotation shaft 31 is on a longitudinal center line of a housing 2. Other configurations are the same as those of the first example embodiment, and therefore, duplicated descriptions are omitted as appropriate.

In the third example embodiment, the operator-side rotation shaft 31 rotates in the same direction as a customer-side rotation shaft 41 by a predetermined angle or less. The predetermined angle is not particularly limited, but is preferably 0 degrees or more and less than 90 degrees. In the POS terminal device according to the third example embodiment, when a customer display 4 is rotated by 90 degrees in the horizontal direction, an operator display 3 and the customer display 4 do not interfere with each other. The POS terminal device according to the third example embodiment is preferably used in the first mode and the third mode illustrated in the first example embodiment. The variation described in the first example embodiment is similarly performed in the POS terminal device according to the third example embodiment as well.

The invention according to the example embodiments described above enables to provide a POS terminal device in which one of the operator display and the customer display can be rotated by 90 degrees in the horizontal direction without interfering with another display even when the sizes of the operator display and the customer display are larger than the size of the housing.

It is noted that the present invention is not limited to the above-mentioned example embodiments, and can be appropriately modified within a range not deviating from the gist.

Although the present invention has been described above with reference to the example embodiments, the present invention is not limited to the above. Various modifications can be made to the structure and details of the present invention which can be understood by a person skilled in the art within the scope of the invention.

This application is based upon and claims the benefit of priority from Japanese patent application No. 2019-131548, filed on Jul. 17, 2019, the disclosure of which is incorporated herein in its entirety by reference.

REFERENCE SIGNS LIST

1 POS terminal device
2 Housing
11 Power source switch
12 Plurality of LEDs
13 Speaker hole for operator
14 Speaker hole for customer
15 Vent hole
3 Operator display
4 Customer display
31 Operator-side rotation shaft
41 Customer-side rotation shaft

What is claimed is:
1. A POS terminal device comprising:
a housing including a rectangular upper surface with short sides and long sides;
a rectangular operator display having a first upper side and a first bottom side facing each other and two first lateral sides facing each other mounted on one of the short sides of the upper surface of the housing perpendicular to the upper surface of the housing; and
a customer display having a second upper side and a second bottom side facing each other and two second lateral sides facing each other mounted on another one of the short sides of the upper surface of the housing perpendicular to the upper surface of the housing, wherein
the operator display and the customer display are arranged in such a way that rear surfaces of each of the respective displays face each other and each of centers of the first upper side and the second upper side of each of the displays passes through a center line connecting centers of the two short sides of the housing,
the operator display has an operator-side rotation shaft that supports the operator display,
the customer display has a customer-side rotation shaft that supports the customer display,
a rotation center of the operator-side rotation shaft is at a position that is spaced apart from the center line,
a rotation center of the customer-side rotation shaft is at a position that is spaced apart from the center line and is provided on an opposite side of the center line from where the operator-side rotation shaft is provided,
the operator display is rotatble by 90 degrees around the operator-side rotation shaft in such a way that the first lateral side that is closer tolocated at closer distance from the rotation center of the operator-side rotation shaft is moved toward the customer display,
the customer display is rotatable by 90 degrees around the customer-side rotation shaft in such a way that the second lateral side that is closer tolocated at closer distance from the rotation center of the customer-side rotation shaft is moved toward the operator display, and the operator display and the customer display do not collide with each other when the operator display is rotated by 90 degrees, and the customer display and the operator display do not collide with each other when the customer display is rotated by 90 degrees.

2. The POS terminal device according to claim 1, wherein a distance between the first lateral side of the operator display that is closer to the rotation center of the operator-side rotation shaft to the rotation center of the operator-side rotation shaft is shorter than a distance projected in the long sides direction of the housing from the rotation center of the operator-side rotation shaft to the rotation center of the customer-side rotation shaft, and a distance between the second lateral side of the customer display that is closer to the rotation center of the customer-side rotation shaft to the rotation center of the customer-side rotation shaft is shorter than a distance projected in the long sides direction of the housing from the rotation center of the customer-side rotation shaft to the rotation center of the operator-side rotation shaft.

3. The POS terminal device according to claim 1, wherein a distance between the operator display and the customer display is shorter than a distance obtained by adding (a) a distance from a center of the first upper side of the operator display ad to the first lateral side and (b) a distance from a center of the second upper side of the customer display to the second lateral side.

4. The POS terminal device according to claim 1, wherein a length of the first upper side of the operator display and a length of the second upper side of the customer display are longer than the short side of the upper surface of the housing and longer than the long side of of the upper surface of the housing.

5. A POS terminal device comprising:

a housing including a rectangular upper surface with short sides and long sides;

a rectangular operator display having a first upper side and a first bottom side facing each other and two first lateral sides facing each other mounted on one of the short sides of the upper surface of the housing perpendicular to the upper surface of the housing; and a customer display having a second upper side and a second bottom side facing each other and two second lateral sides facing each other mounted on another one of the short sides of the upper surface of the housing perpendicular to the upper surface of the housing, wherein the operator display and the customer display are arranged in such a way that rear surfaces of each of the respective displays face each other and each of center points of the first upper side and the second upper side of each of the displays passes through a longitudinal center line connecting centers of the two short sides of the housing, the operator display has an operator-side rotation shaft that supports the operator display and allows the operator display to be rotated by a predetermined angle or less in a horizontal direction parallel to the upper surface of the housing, the customer display has a customer-side rotation shaft that supports the customer display, a rotation center of the operator-side rotation shaft is at a position that is spaced apart from the center line, a rotation center of the customer-side rotation shaft is at a position on the center line, the operator display is rotatable by 90 degrees around the operator-side rotation shaft in such a way that a-the first lateral side that is closer tolocated at closer distance from the rotation center of the operator-side rotation shaft is moved toward the customer display, and the operator display and the customer display do not collide with each other when the operator display is rotated by 90 degrees.

6. A POS terminal device comprising:

a housing including a rectangular upper surface with short sides and long sides;

a rectangular operator display having a first upper side and a first bottom side facing each other and two first lateral sides facing each other mounted on one of the short sides of the upper surface of the housing perpendicular to the upper surface of the housing; and a customer display having a second upper side and a second bottom side facing each other and two second lateral sides facing each other mounted on another one of the short sides of the upper surface of the housing perpendicular to the upper surface of the housing, wherein the operator display and the customer display are arranged in such a way that rear surfaces of each of the respective displays face each other and each of center points of the first upper side and the second upper side of each of the displays passes through a longitudinal center line connecting centers of the two short sides of the housing, the operator display has an operator-side rotation shaft that supports the operator display, the customer display has a customer-side rotation shaft that supports the customer display, a rotation center of the customer-side rotation shaft is at a position that is spaced apart from the center line, a rotation center of the operator-side rotation shaft is at a position on the center line, and the customer display by 90 degrees around the customer-side rotation shaft in such a way that the first lateral side that is closer to the rotation center of the customer-side rotation shaft is moved toward the operator display.

the operator display and the customer display do not collide with each other when the customer display is rotated by 90 degrees.

* * * * *